United States Patent

Falk

[15] 3,644,720

[45] Feb. 22, 1972

[54] GAIN MULTIPLIER

[72] Inventor: Ronald E. Falk, Bristol, Conn.

[73] Assignee: Chandler Evans Inc., West Hartford, Conn.

[22] Filed: Oct. 6, 1969

[21] Appl. No.: 863,977

[52] U.S. Cl. ....................235/150.1, 235/92 MP, 235/92 CT, 318/603, 318/619

[51] Int. Cl. ........................................................G05b 11/26

[58] Field of Search ..........................318/603, 619, 696, 685; 235/92, 28, 50, 151.11

[56] References Cited

UNITED STATES PATENTS

| | | | |
|---|---|---|---|
| 3,206,665 | 9/1965 | Burlingham | 318/603 X |
| 3,458,821 | 7/1969 | Clarridge | 328/1 |
| 3,466,517 | 9/1969 | Leenhouts | 318/696 X |
| 3,505,577 | 4/1970 | Hirokawa | 318/619 X |

*Primary Examiner*—Eugene G. Botz
*Attorney*—Fishman and Van Kirk

[57] ABSTRACT

Circuitry for digitally implementing gain variation as a function of input signal magnitude. Gain variation, in stepwise fashion, in either a feedback or forward loop is achieved by varying the weight given signals applied to a counter. In the feed forward embodiment, the output of the counter comprises the circuit output signal while in the feedback loop embodiment the output of the counter is compared with a stored count commensurate with the circuit input signal.

6 Claims, 5 Drawing Figures

INVENTOR
RONALD E. FALK

BY

*FISHMAN & VAN KIRK*
ATTORNEYS

GAIN MULTIPLIER

BACKGROUND OF THE INVENTION

1. Field of the Invention

The present invention relates to the dynamic compensation of control systems. More specifically, the present invention is directed to circuitry which digitally accomplishes gain variation as a function of input signal magnitude. Accordingly, the general objects of the present invention are to provide novel and improved methods and apparatus of such character.

2. Description of the Prior Art

While not limited thereto in its utility, the present invention has been found to be particularly well suited for use in circuitry employed in the control of electrical actuators such as, for example, stepping motors. The desirability of exercising control over an actuator through the use of digital circuit techniques is well known. While digital servosystems have been proposed, none of the prior art systems have provided for variable gain as a function of input signal magnitude. Accordingly, there has previously been no means for achieving dynamic compensation of digital servocontrol systems whereby the system would exhibit gain which varied directly with input signal magnitude. High gain is necessary in order to obtain acceptably rapid response of a digital servo system. However, a combination of high gain and low-magnitude error will inherently result in overshoot and hunting.

The present invention has been found to be particularly useful when associated with a digital proportional servosystem such as that disclosed in copending application Ser. No. 836,122, now U.S. Pat. No. 3,593,097, of Edward F. Gebelien and assigned to the assignee of the present invention. The disclosure of said copending application is, accordingly, incorporated herein by reference and the relationship of the present invention and that of U.S. Pat. No. 3,593,097 will be explained in detail below.

SUMMARY OF THE INVENTION

The present invention overcomes the above briefly discussed and other disadvantages of the prior art by providing a digital circuit characterized by gain which varies in stepwise fashion with input signal magnitude. In accordance with the present invention, gain variation may be achieved in either a feedback or forward loop. In either case gain adjustment is achieved by varying the weight at which pulses are counted; the change in weight assigned to pulses applied to a counter being controlled as a function of either circuit input signal or circuit output signal magnitude.

Considering the feedback loop embodiment of the present invention, system output pulses are employed to control the application of a digital feedback signal to a "position" counter either directly or via frequency division circuitry. The magnitude of the feedback signal is sensed and, if in excess of a predetermined value, will cause the feedback signal to be routed to the position counter via the frequency divider whereby the feedback pulses will be counted at a lower weight. The output of the position counter is compared with the digital input signal and the difference in counts comprises the output of the circuit.

Considering the forward loop embodiment of the present invention, the digital input signals are transmitted, via suitable switching circuitry, either to a counter or to the counter via frequency division circuitry. Again depending on the magnitude of the digital input signal as initially applied to the counter, the input signal will either be counted at its actual weight or, if directed through the frequency division circuitry, at a reduced weight whereby gain will be varied in accordance with input signal magnitude.

BRIEF DESCRIPTION OF THE DRAWING

The present invention may be better understood and its numerous objects and advantages will become apparent to those skilled in the art by reference to the accompanying drawing wherein like reference numerals refer to like elements in the various figures and in which.

DESCRIPTION OF THE PREFERRED EMBODIMENTS

Figures 1, 2:
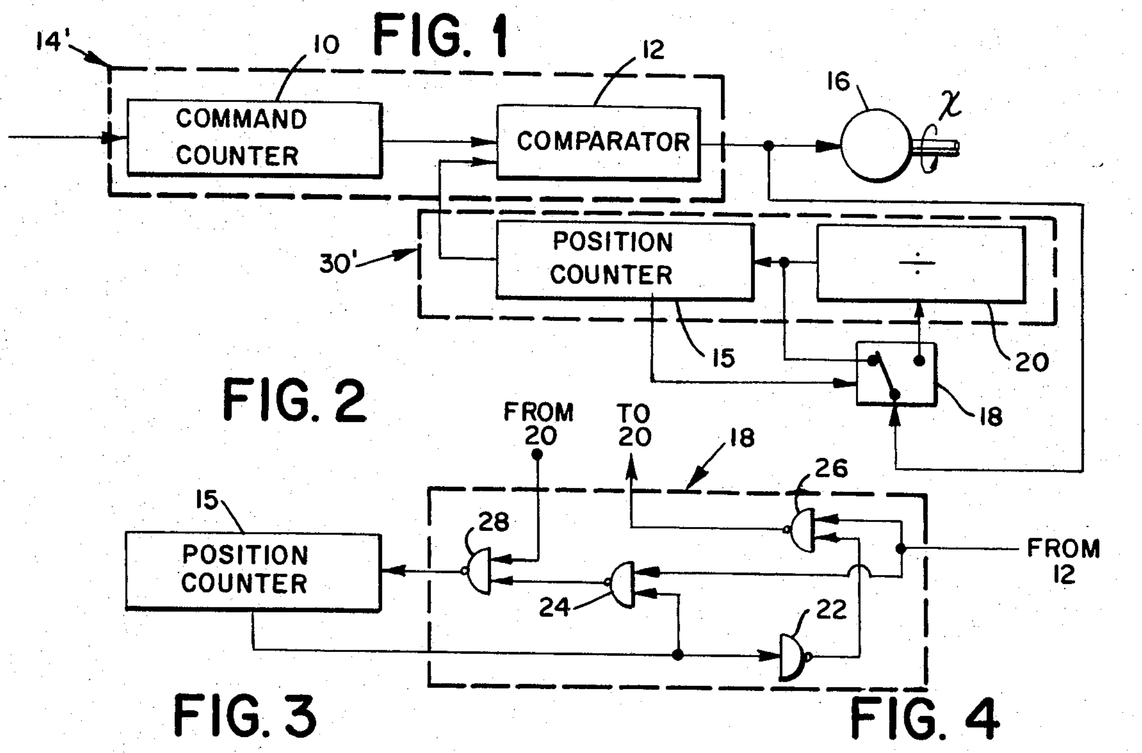
FIG. 1 is a block diagram from a first embodiment of the present invention, the embodiment of FIG. 1 contemplating gain variation in a feedback loop.
FIG. 2 is a block diagram of electronic switching circuitry suitable for use in the present invention.

With reference now to FIG. 1, a first embodiment of the present invention, wherein the proportional gain multiplier takes the form of a feedback loop, is disclosed. The embodiment of FIG. 1 comprises a command counter 10 which receives a position command signal as an input. The input signal to counter 10 will comprise groups of pulses, the number of pulses in each group being commensurate with the magnitude of a position command. In the usual instance, and as disclosed in aforementioned U.S. Pat. No. 3,593,097, the position command will typically be received as a pulse width modulated signal which is employed to gate pulses from a high-frequency oscillator. As will be described in detail below, command counter 10 may comprise a parallel loading "up" counter such as, for example, a Signetics Corporation Model 8281 binary counter with parallel entry. The desirability of using a counter with parallel entry will become apparent from the description below.

The output of command counter 10 is compared with a count which, for example, simulates the actual position of an actuator being controlled. Thus, the output of command counter 10 is compared in comparator 12 with the count stored in a position counter 15. In actual practice, the function of comparator 12 may be performed by the circuit which performs the function of command counter 10; hence the desirability of a parallel entry counter. The position counter 15 may, for example, comprise a serial entry up-down counter with limited capacity such as Sylvania Electric Products Type SM–180.

The output resulting from the digital comparison of the "-command" and "position " counts will comprise the output of the embodiment of FIG. 1. In FIG. 1 this output signal is shown as being applied as the control input to a stepping motor 16 which would be operatively connected to apparatus, typically a valve or similar actuator, which is to be controlled. In order to enable position counter 15 to simulate the step motor 16 output shaft position, the output of comparator 12 must be fed back to counter 15. In accordance with the present invention, the comparator output signal is fed back to counter 15 either directly or via a frequency divider 20; the routing of the feedback signal being controlled by a solid state switch 18. As may be seen from FIG. 2, switch 18 comprises a suitably connected series of NAND gates. The control input to switch 18 will be actuated whenever the last received group of circuit output pulses is in excess of a preselected number. With switch 18 in the unactuated position, the feedback pulses will be delivered directly to counter 15 and totalized. When actuated, switch 18 will cause the feedback pulses to be delivered to counter 15 via frequency division circuit 20.

The system of FIG. 1 is a proportional digital servo system having a gain change as a function of input signal magnitude. The variation in gain X with control variable $\epsilon$ may be seen graphically from FIG. 3. Presuming that the control variable $\epsilon$ is below the break count point where the slope of the gain curve changes, the normal action of the above-described circuit is to compare the number stored in command counter 10 with that in position counter 15. The difference between the two counts will be delivered to motor 16 or other circuitry and will simultaneously be fed back to counter 15. The system will function as a proportional servo since the net output position will try to be equal to the magnitude of the input command.

Figures 3, 4, 5:
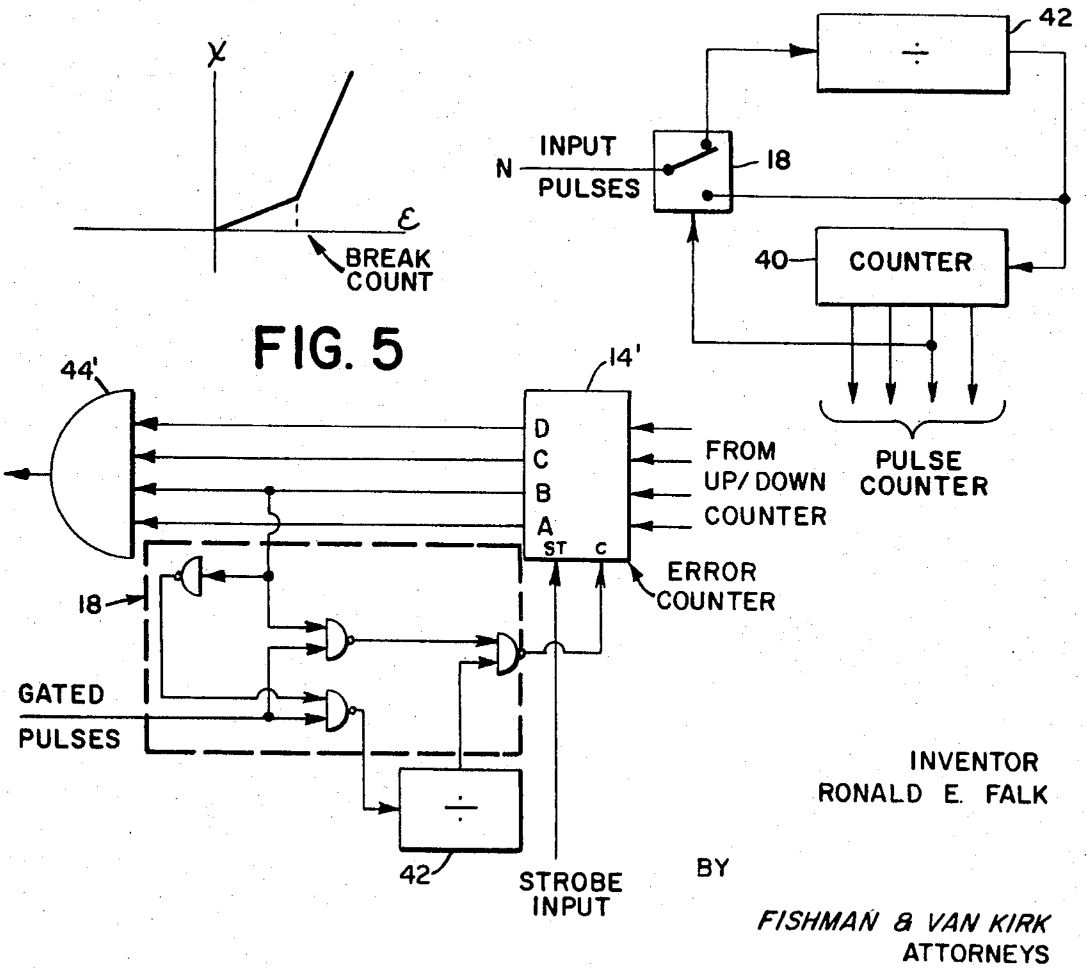
FIG. 3 is a graphical presentation of gain variation in accordance with the present invention.
FIG. 4 is a block diagram of a second embodiment of the present invention, the embodiment of FIG. 4 contemplating gain variation in a forward loop.
FIG. 5 is a partial block diagram depicting incorporation of the present invention in the digital proportional servosystem of copending application U.S. Pat. No. 3,593,097.

When the control variable $\epsilon$ exceeds the break count point as shown in FIG. 3, in order to enhance the rate at which the position error as represented by the input command signal is nulled, the gain of the system will be increased. The change in system gain with input signal magnitude is affected by detouring the feedback pulses from comparator 12 through frequency divider 20. Frequency divider 20 may comprise one or more bistable multivibrator circuits depending on the degree of gain change desired. By detouring the feedback pulses reaching position counter 15 through a frequency divider, the control pulses delivered to motor 16 will be counted into position counter 15 at a lower weight. Considering the example where frequency divider 20 consists of a single multivibrator circuit, position counter 15 will change its count with every second control pulse delivered to motor 16. The effect of counting the step motor control pulses at a lower weight is to require the system to step the motor 16 further to null out a given position error above the break count point.

The break count point may be selected at random by connecting the control input of switch 18 to any desired stage of counter 15. Referring to FIG. 2, which is a block diagram of switch 18 as comprised of NAND logic gates, the selected stage of counter 15 is connected back to gates 22 and 24 of switch 18. The output resulting from the digital comparison of the counts in counters 10 and 15, as performed by comparator 12, is applied as the other input to gate 24 and also as an input to gate 26. With small magnitude errors, there will be no signal (i.e., a positive or zero potential indicative of a "zero") fed back to gates 22 and 24 from counter 15 and gate 24 will pass signals in the form of negative pulses commensurate with "ones" applied thereto from comparator 12, such signals thus being delivered to counter 15 via gate 28. At this time, gate 26 will be disabled by the one output provided by gate 22 with no input applied thereto. When counter 15 has been counted up past the break count point; i.e., at least to the stage which is connected back to switch 18; a "one" signal will be applied to gates 22 and 24. This signal will disable gate 24 (i.e., gate 24 will not pass "ones" resulting from the comparison) and cause gate 22 to change state thereby removing the "disabling" signal from gate 26. Accordingly, the result of the digital comparison will be applied via gate 26 to frequency divider 20. The output of frequency divider 20 will be delivered, via gate 28, to counter 15.

Considered in conjunction with the digital proportional servo system of U.S. Pat. No. 3,593,097, the function of position counter 15 of the present invention will be performed by the up/down counter 30 of the copending application and the least significant stage or stages of counter 30 will perform the function of frequency divider 20 of the present invention. In FIG. 1, the equivalent circuitry of the up/down counter of U.S. Pat. No. 3,593,097 is indicated generally at 30'. The combined functions of command counter 10 and comparator 12 of the present invention will be performed, as discussed above, by the error counter 14 of U.S. Pat. No. 3,593,097. This circuit is indicated generally in FIG. 1 at 14'.

Referring now to FIG. 4, a second embodiment of the present invention wherein gain change is accomplished in a forward loop is disclosed. The embodiment of FIG. 4 is essentially the compliments of the embodiment of FIG. 1. In FIG. 4, input pulses commensurate with a position command are initially, presuming error magnitude less than the break count level, detoured to a counter 40 via a frequency divider 42. As in the embodiment of FIG. 1, routing of input pulses either directly to counter 40 or to counter 40 via frequency divider 42 is accomplished under the control of switch 18. The detouring of the input pulses through frequency divider 42 results in the position command counts being reduced in weight. When the magnitude of the input signals exceeds the break count point, as established by a selection and interconnection of a stage of counter 40 to the control input of switch 18, the input pulses will be routed directly to counter 40 and will thus be counted at their full weight. Restated, when the number in counter 40 reaches preselected value a control signal will be fed back to switch 18 and will cause the switch to change state. Operation of switch 18 will cause the input pulses to bypass frequency divider 42 and thus be counted at their full weight by counter 40. The output of counter 40 will accordingly increase at a faster rate and the two step gain illustrated in FIG. 3 will be obtained.

In the embodiment of FIG. 4, the switch 18 and frequency divider 42 may incorporate the same circuitry as discussed above as respectively employed in switch 18 and frequency divider 20 of the FIG. 1 embodiment. Counter 40 of the FIG. 4 embodiment may be identical to command counter 10 of the embodiment of FIG. 1.

FIG. 5 indicates the manner in which the proportional gain multiplier of FIG. 4 may be incorporated into the digital proportional servo system of U.S. Pat. No. 3,593,097. In actual practice, the only additional circuitry which must be incorporated comprises switch 18. That is, the function of frequency divider 42 may be performed by the first stage of the error counter. In the interest of facilitating understanding of the invention, however, frequency divider 42 has been shown as separate circuitry in FIG. 5.

While preferred embodiments have been shown and described, various modifications and substitutions may be made thereto without departing from the spirit and scope of the present invention. Accordingly, it is to be understood that the present invention has been described by way of illustration and not limitation.

What is claimed is:

1. A variable gain circuit comprising:

first pulse counter means having a plurality of stages and input and output terminals;

frequency changer means having an input terminal and an output terminal coupled to said first pulse counter means input terminal; and electronic switch means connected and responsive to a preselected state of said first pulse counter means, said switch means having an input terminal and a pair of output terminals respectively connected to said frequency changer means and pulse counter means input terminals, said switch means being in a first state when said counter has totalized a count less than that commensurate with said preselected stage and being in a second state when said counter has counted up to a count commensurate with said preselected stage, the state of said switch means determining whether pulses applied to said switch means input terminal are applied by said switch means directly to said counter means and counted at full weight or are routed to said counter via said frequency changer means and counted at an artificial weight.

2. The apparatus of claim 1 wherein said frequency changer means comprises:

a frequency divider, said switch means input pulses being routed through said divider when said switch means is in said first state.

3. The apparatus of claim 1 wherein said frequency changer means comprises:

a frequency divider, said switch means input pulses being routed through said divider when said switch means is in said second state.

4. The apparatus of claim 3 further comprising:

second pulse counter means, input pulses being applied to said second pulse counter means; and comparator means connected to the outputs of said pulse counter means for digitally comparing the counts stored therein, the output of said comparator means being connected to the input terminal of said switch means whereby the output of said comparator will be fed back to said pulse counter means in an altered or unaltered state.

5. A method of varying the gain of a digital control system comprising:

varying in step wise fashion the weight at which input pulses are counted in accordance with the magnitude of the input signal;

counting the thus weighted pulses; and applying the totalized pulse count to a mechanism to be controlled.

6. A method of varying the gain of a digital control system comprising:

counting input pulses commensurate with a command signal;

counting feedback pulses commensurate with control system output signals;

comparing the stored input and feedback counts to provide a system output signal; and varying the weight at which the feedback pulses are counted in accordance with the magnitude of the system output signals.

* * * * *